UNITED STATES PATENT OFFICE.

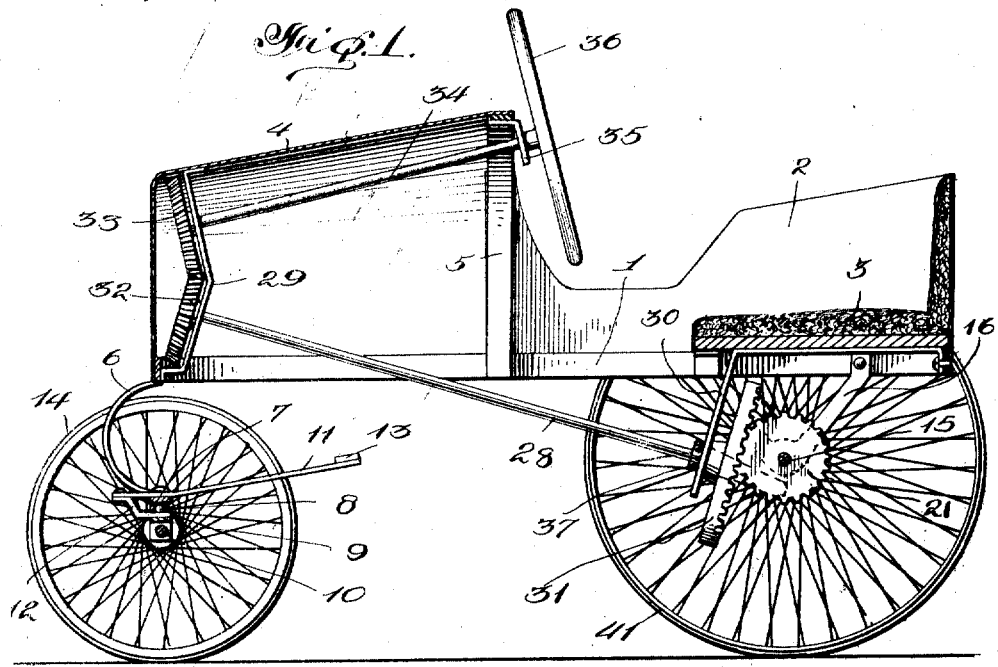
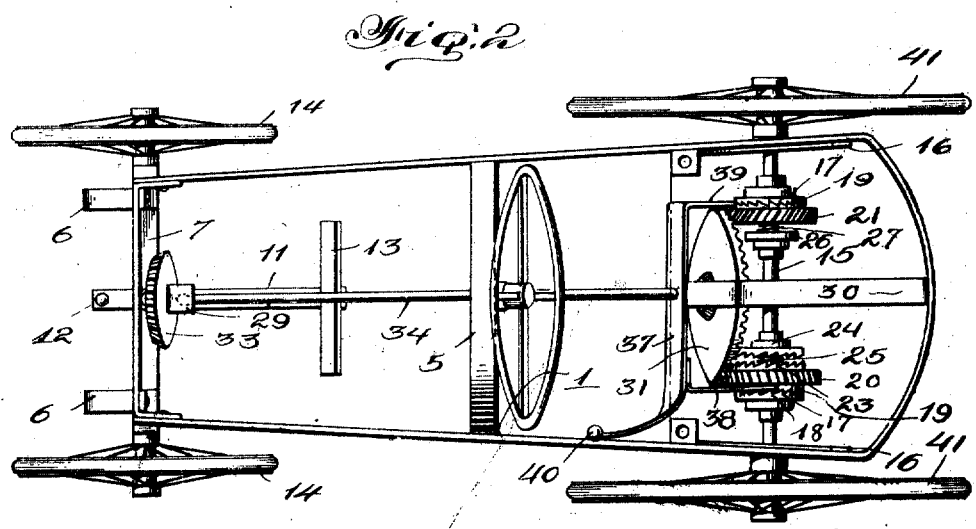

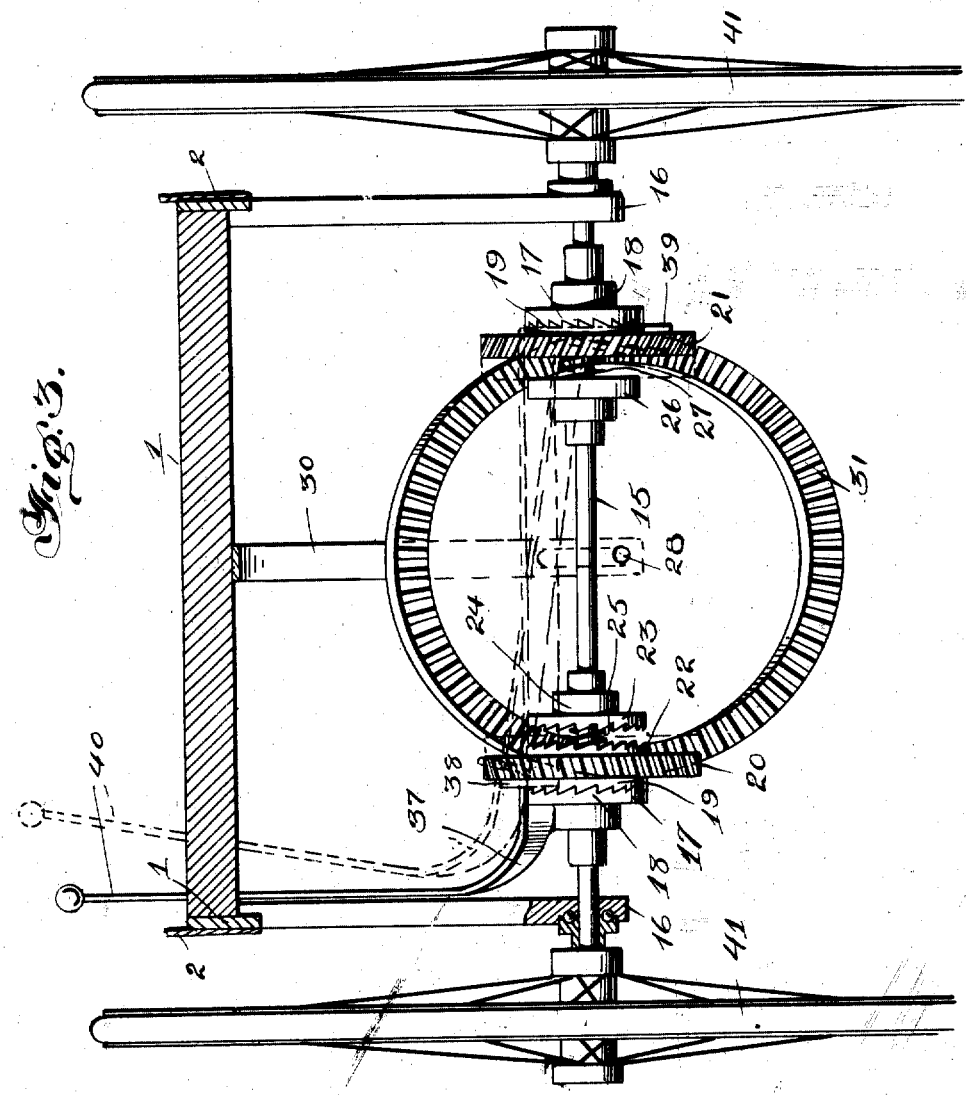

OTTO KARCHER, OF CANTON, OHIO.

HAND-PROPELLED VEHICLE.

1,214,475.    Specification of Letters Patent.    Patented Jan. 30, 1917.

Application filed November 27, 1916. Serial No. 133,545.

*To all whom it may concern:*

Be it known that I, OTTO KARCHER, a citizen of the United States, residing at Canton, in the county of Stark and State of Ohio, have invented a new and useful Hand-Propelled Vehicle, of which the following is a specification.

My invention relates to hand propelled vehicles and has more especial reference to a toy vehicle provided with a hand wheel by which the vehicle is propelled.

The object of my invention is to provide a hand propelled vehicle adapted to be propelled by a hand wheel.

A further object is to provide a device of this character which may be propelled either forward or backward.

Still another object is to provide means for applying a brake to the wheels of the vehicle when desired.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings: Figure 1 is a longitudinal sectional view through a device constructed in accordance with my invention. Fig. 2 is a top plan view of the same, the hood being removed for purpose of illustration. Fig. 3 is a rear end view of the vehicle upon an enlarged scale, parts being broken away for the purpose of illustration.

Similar numerals of reference indicate corresponding parts throughout the several figures of the drawings.

Referring more especially to the construction illustrated in the accompanying drawings, the numeral 1 indicates the frame generally, said frame being provided with a body portion 2 and a seat 3, a hood 4 being provided upon the forward portion of the frame in order to present the appearance of an automobile. An inverted U-shaped supporting frame 5 is preferably located at the rear extremity of the hood 4 for the purpose of reinforcing the same.

Springs 6 are attached to the forward extremity of the frame 1 and support a cross bar 7, to which is pivotally connected by means of a king pin 8, the member 9, which carries the front axle 10. For the purpose of steering the vehicle a bar 11 is connected to the member 9 by means of a bracket 12, a cross piece 13 being provided at the rear extremity of the bar 11 and adapted to be oscillated by the feet of the operator. The front wheels 14 of the vehicle are rotatably mounted upon the front axle in any suitable and well known manner.

The rear axle 15 is journaled in brackets 16 supported from the frame 1. Fixedly mounted upon the rear axle 15 is a pair of spaced clutch members 17, said clutch members being provided upon their inner faces with ratchet teeth 18 arranged to be engaged by the ratchet teeth 19 carried upon the spiral gears 20 and 21, said gears being slidably and rotatably mounted upon the axle 15, the gear 20 being provided upon the inner face with ratchet teeth 22 arranged to engage the ratchet teeth 23 provided upon the fixed clutch member 24, a spring 25 being interposed between said clutch member 24 and the gear 20 for the purpose of normally holding the ratchet teeth 22 upon said gear out of engagement with the ratchet teeth 23 upon the clutch member 24. A collar 26 is fixedly mounted upon the axle 15 and spaced from the gear 21, a spring 27 being interposed between said collar and the gear 21 for the purpose of normally holding the gear away from the collar.

The inclined shaft 28 is journaled in brackets 29 and 30 carried in the hood and at the rear end of the frame respectively, a crown gear 31 being provided upon the rear extremity of said shaft, the center of said crown gear being located a slight distance below the center of the rear axle 15 in order to allow said crown gear to mesh properly with the spiral gears 20 and 21.

A beveled gear 32 is provided upon the forward extremity of the shaft 28 and meshes with a beveled gear 33 provided upon the forward extremity of the shaft 34, said shaft being journaled in the bearings 29 and 35, a hand wheel 36 being provided upon the rear extremity of said shaft 34 for the purpose of propelling the vehicle as will be hereinafter described.

A yoke 37 is pivotally mounted upon the shaft 28 adjacent the crown gear 31, said yoke being provided with the rearwardly extended arms 38 and 39, which engage the gears 20 and 21 respectively, the arm 38 resting upon the hub of the gear 20 while the arm 39 engages the under surface of the hub of the gear 21. A handle 40 is provided upon the yoke 37 for the purpose of operating the yoke to reverse the vehicle or brake the rear wheels 41 when desired.

In operating the vehicle the operator sits upon the seat 3 with his feet resting upon the cross bar 13 for the purpose of steering the front wheels, the hand wheel 36 being gripped and alternately rotated in opposite directions or continuously in one direction as desired. When the hand wheel is rotated to the left the teeth 19 upon the gear 21 will mesh with the teeth 18 upon the adjacent clutch member 17 rotating the rear axle 15 in a direction to drive the rear wheels 41 carried thereby forwardly, thus propelling the vehicle in a forward direction. While the crown gear is being rotated in this direction the gear 20 will be caused to move out of engagement with the ratchet teeth 18 upon the clutch member 17, owing to the spiral construction of said gear, and the gear 20 will thus be rotated loosely upon the rear axle 15. As the hand wheel 36 is reversed and rotated in the opposite direction the gear 21 will be drawn out of engagement with the adjacent clutch member and the gear 20 will engage the adjacent clutch member 17 continuing to drive the vehicle forward. If it is desired to coast the hand wheel may be held stationary and the vehicle may coast with its own momentum or down an inclined grade, the gears 20 and 21 remaining stationary while the ratchet teeth 18 upon the clutch members 17 will click over the ratchet teeth 19 upon the gears 20 and 21. If desired the yoke 37 may be rocked slightly by means of the handle 40 when the vehicle is coasting, bringing the ratchet teeth 19 upon the gears 20 and 21 just out of engagement with the ratchet teeth 18 upon the clutch members 17, thus allowing the vehicle to coast easily without any undue friction of the clutch members.

When it is desired to reverse the vehicle, that is to back the same, the handle 40 of the yoke 37 is grasped by the operator and removed into the dotted position as shown in Fig. 3, the arms 38 and 39 upon said yoke moving the gears 20 and 21 into the position shown in dotted lines in said figure, thus bringing the ratchet teeth 19 upon said gears out of engagement with the ratchet teeth 18 upon the clutch members 17 and throwing the ratchet teeth 22 upon the gear 20 into engagement with the ratchet teeth 23 upon the clutch member 24. The hand wheel 36 is rotated to the left and the rear axle 15 is driven backward thus reversing the direction of the vehicle.

When it is desired to apply a brake to the vehicle the yoke 37 may be rocked by means of the handle 40 into the position shown in Fig. 3, thus bringing the ratchet teeth 22 upon the gear 20 into engagement with the ratchet teeth 23 upon the clutch member 24 and by holding the hand wheel 36 stationary the rear wheels 40 of the vehicle will thus be locked against rotation.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In a hand propelled vehicle, an axle, a longitudinally disposed shaft rotatable in two directions, a driving gear fixed to said shaft, two gears loosely mounted upon said axle and engaging said driving gear so as to be driven thereby simultaneously in reverse directions, clutch members fixed on said axle adjacent to said driven gears, clutch members carried by said driven gears and engaging said first named clutch members and arranged to rotate the latter in the same direction, thereby continuously rotating the axle in one direction and a rotatable hand wheel connected to said longitudinally disposed shaft and arranged to rotate said shaft in either direction.

2. In a hand propelled vehicle, an axle, a longitudinally disposed shaft rotatable in two directions, a driving gear fixed to said shaft, two oppositely disposed spiral gears loosely mounted upon said axle and engaging said driving gear so as to be driven thereby simultaneously in reverse directions, clutch members fixed on said axle adjacent said driven gears, clutch members carried by said driven gears and engaging said first named clutch members and arranged to rotate the latter in the same direction thereby continuously rotating the axle in one direction and a rotatable hand wheel connected to said longitudinally disposed shaft and arranged to rotate said shaft in either direction.

3. In a hand propelled vehicle, an axle, a longitudinally disposed shaft rotatable in both directions, a driving gear fixed to said shaft at a point below the center of said axle, two oppositely disposed spiral gears loosely mounted upon said axle and engaging said driving gear so as to be driven thereby simultaneously in reverse directions, clutch members fixed on said axle adjacent said driven gears, clutch members carried by said driven gears and engaging said first named clutch members and arranged to rotate the latter in the same direction thereby continuously rotating the axle in one direction and a rotatable hand wheel connected to said longitudinally disposed shaft and arranged to rotate said shaft in either direction.

4. In a hand propelled vehicle, an axle, a longitudinally disposed shaft rotatable in two directions, a driving gear fixed to said shaft at a point below the center of said axle, two oppositely disposed spiral gears loosely and slidably mounted upon said axle and engaging said driving gear so as to be driven thereby simultaneously in reverse directions, clutch members fixed on said axle adjacent said driven gears, clutch members carried by said driven gears and arranged to engage said first named clutch members to rotate the latter in the same direction, thereby continuously rotating the axle in one direction, springs arranged to normally hold said driven gears in engagement with their respective clutch members, said driving gear by virtue of its location with reference to the axle alternately holding each driven gear out of engagement with the adjacent clutch member while the other driven gear is held in engagement with its adjacent clutch member and a hand hold connected to said longitudinally disposed shaft and arranged to rotate said shaft in either direction.

5. In a hand propelled vehicle, an axle, a longitudinally disposed shaft rotatable in both directions, a driving gear fixed to said shaft at a point below the center of said axle, two oppositely disposed spiral gears loosely mounted upon said axle and engaging said driving gear so as to be driven thereby simultaneously in reverse directions, clutch members fixed on said axle adjacent said driven gears, clutch members carried by said driven gears and arranged to engage said first named clutch members to rotate the latter in the same direction thereby continuously rotating the axle in one direction, a pinion fixed upon said longitudinally disposed shaft, a second pinion meshing with said first named pinion, a shaft upon which said second named pinion is fixed and a hand wheel fixed upon said last named shaft.

6. In a hand propelled vehicle, an axle, a longitudinally disposed shaft rotatable in both directions, a driving gear fixed to said shaft at a point below the center of said axle, two oppositely disposed spiral gears loosely and slidably mounted upon said axle and engaging said driving gear so as to be driven thereby simultaneously in reverse directions, clutch members fixed upon said axle adjacent said driven gears, clutch members carried by said driven gears and arranged to engage said first named clutch members to rotate the latter in the same direction, thereby continuously rotating the axle in one direction, a reversing clutch fixed upon said axle adjacent one of said driven gears, means for sliding the last named gear into engagement with said reversing clutch and a hand wheel connected to said longitudinally disposed shaft and arranged to rotate said shaft in either direction.

7. In a hand propelled vehicle, an axle, a longitudinally disposed shaft rotatable in two directions, a driving gear fixed to said shaft at a point below the center of said axle, a spiral gear loosely and slidably mounted upon said axle and engaging said driving gear so as to be driven thereby, fixed clutch members carried upon said axle and spaced from each side of said driven gear, means for normally holding said driven gear in engagement with one of said clutch members to rotate the latter in one direction, means for slidably moving said driven gear into engagement with the other clutch member to rotate the latter in the opposite direction and a hand hold connected to said shaft and arranged to rotate the latter in either direction.

In testimony that I claim the above, I have hereunto subscribed my name.

OTTO KARCHER.